inventor
John F. Reeves 3,038,628
SANDWICH STRUCTURE FOR PLASTIC TANKS
John F. Reeves, Green Village, N.J.
(4162 N. Lake Drive, Milwaukee 11, Wis.)
Filed June 20, 1958, Ser. No. 743,458
8 Claims. (Cl. 220—9)

This invention is a method of providing the same structural strength as from curved tank heads, when the heads are a sandwich structure that is flat, and of making a force applied from inside against a flat sandwich head bear in tension on the outside plastic skin of the sandwich tank body, as well as on the inside skin, without this force being limited either by the strength properties of the sandwich head as a beam structure, or by the compressive yield strength of the core material.

As is known, it has been the practice in the construction of single skin tanks to make the heads strong enough to withstand the pressure of fluid loads by curving them either in swept back fashion or a dished shape, or, in other words, making them in either single or double curvature. In the manufacture of sandwich wall tanks, it is practicable for most fluid loads to make the heads a simple flat sandwich construction because of the considerable beam strength possessed by this type of construction as compared with a single skin construction. However, for loads that exert a considerable force against the heads of a tank, it is still desirable to incorporate the strength properties that are inherent in curved shapes along with the sandwich construction. Also, in a sandwich tank it is important that when a considerable force is applied against the inside of the head it exert a full tensile stress on the outside skin of the tank body as well as on the inside skin. It will be appreciated that with a simple flat sandwich construction this is difficult to achieve as a force applied against the inside of the head can only be transmitted to the outside within the limits of the compressive yield strength of the sandwich core, or the core material will compress.

What I have found is that the same structural strength as is provided by curved tank heads can be achieved when the heads are flat by molding a curved plastic head within the sandwich wall, and making this curved head attach to the adjacent inside skin of the tank body. Also, I find that by continuing this curved plastic head to the outside skin of the tank body and attaching it to this skin as well, a force against the inside of the tank head can be made to bear on the outside as well as the inside skin of the tank body, without being limited either by the strength properties of the head as a beam structure or by the compressive yield strength of the core material.

The particular features of this invention will become more apparent as reference is made to the appended drawings.

Figure 2:
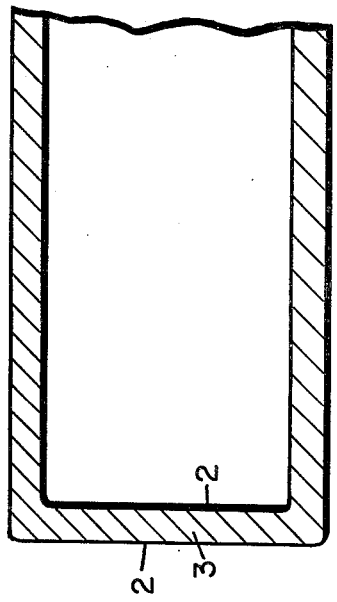
Figure 4:
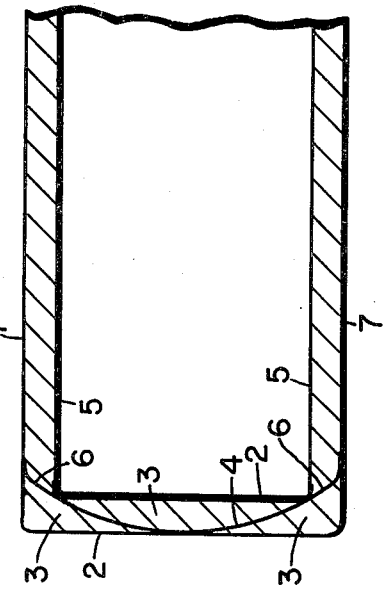
Figure 1:
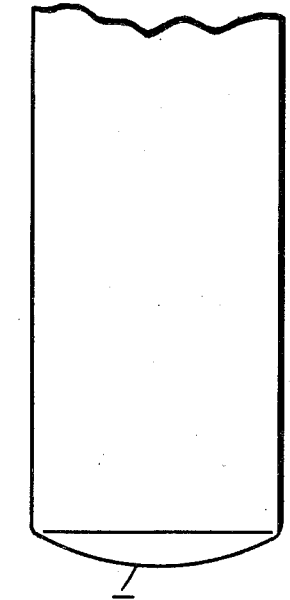
Figure 3:
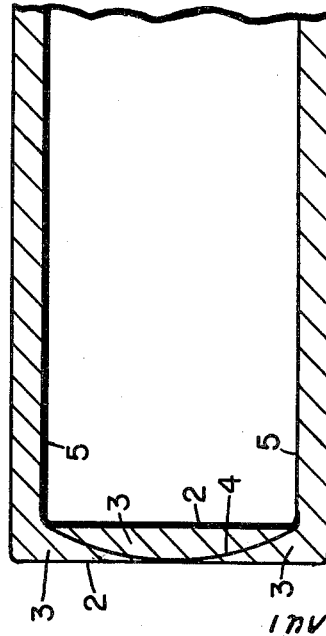

FIGURE 1 is a side sectional view of one end of a single skinned tank with a curved head. FIGURE 2 is a side sectional view of one end of a sandwich tank with a flat head. FIGURE 3 is a side sectional view of one end of a sandwich tank with a flat head and with a curved head molded in the wall of the flat head and attaching to the inside skin of the tank body. FIGURE 4 is a side sectional view of one end of a sandwich tank with a flat head with a curved head molded in the wall of the flat head and attaching to the inside skin of the tank body, and with this same curved head continuing thru the sandwich wall of the tank body and attaching to the outside skin.

Referring to FIGURE 1, reference numeral 1 indicates a curved tank head, in this case a dished head. Because of the curved shape of this head, an internal force applied against it will stress the material from which it is made in tension, rather than in flexure in which a single skin construction normally is weak. Referring to FIGURES 2, 3 and 4, the numeral 2 indicates the skins of a flat sandwich head, and the numeral 3 the core of the sandwich. In such constructions the core 3 usually has little structural strength, its primary purpose being to hold the skins which are bonded to it apart from each other and then to maintain these skins in column so that a bending force exerted against the sandwich panels will have to stress the skins in tension and compression, rather than merely in flexure. The strength properties of sandwich panels are quite similar to the strength properties of an I beam, and for this reason these properties are often referred to as their beam strength. Referring to FIGURES 3 and 4 the numeral 4 indicates a curved head molded in the wall 3 of a flat sandwich head, and attaching to the inside surfaces 5 of the tank body. In this case, pressure against the flat sandwich head will be contained not only by the beam strength of the sandwitch construction but also by the tensile strength of the curved head. This curved head 4 is attached only to the inside skin 5 of the tank body and thus bears in tension only on this skin. Referring to FIGURE 4, the numeral 6 indicates a continuation of the curved head 4 thru the core of the tank body and attaching to the outside skin 7. In this FIGURE 4 it can be seen that a force exerted from inside against the curved head 4 will bear on both the inside and outside skins of the tank body. A further strength precaution which should be pointed out at this juncture is that if the pressure against the inside surface of the flat sandwich head is greater than the compressive strength of the core material contained between curved head 4 and the inside skin 2, some compression of the core material may occur. Care should therefore be taken to see that the compressive strength of the core material in this area is sufficient to withstand any anticipated internal pressures.

As has been stated, flat sandwich heads are strong enough for many uses. However, I find that when unusual pressures against the heads occur, such as from surge loads in over the road transportation, from bumping in railroad use, from extreme sloshing aboard ship, or from internal built up pressures, or even from gravity pressures, particularly during rapid acceleration when airborne, the additional strength provided by a curved shape is necessary.

Curving the entire sandwich head, that is making both the inside and outside surfaces curved, would of course provide the requisite curved shape. However, in building molds for very large tanks it is quite expensive to make these molds for curved heads, and there are other molding problems such as the withdrawal of the tank from the mold when there are underlets, and the preparation of the component molding materials for curved heads. It is much simpler to build molds for flat heads, and to prepare the component molding materials for flat heads, with the curved head molded within the flat sandwich wall. Also, merely curving the sandwich head inside and out still does not overcome the difficulty that a force applied against the inside of the head can only be transmitted to the outside surface within the limits of the compressive yield strength of the core material.

Variations of the construction described in this invention will readily be apparent to those skilled in the structural arts; for instance, instead of curved heads molded in the sandwich wall, the heads might by comprised of several flat sections so arranged as to have the same approximate effect as a curved head. Also, not just tanks, but any sandwich container, even one flat on all sides, could be strengthened in this manner and made to withstand great internal pressures.

What I claim is:

1. In a plastic sandwich construction, an inner skin, an outer skin spaced therefrom, an outwardly curved head of plastic material between said skins having a surrounding marginal portion adjacent said inner skin with other portions curved away to form a space and said head having a portion adjacent said outer skin with space between other portions of the head and said outer skin, core material of relatively low structural strength filling said space between said inner skin and the inner side of said head, and core material of relatively low structural strength filling said space between said outer skin and the outer side of said head.

2. In a plastic sandwich construction, an inner skin, an outer skin spaced therefrom, an outwardly curved circular head of plastic material between said skins having a circular portion adjacent said inner skin with other portions curved away to form a space and said head having a portion adjacent said outer skin with space between the other portions of the head and said outer skin, core material of relatively low structural strength filling said space between said inner skin and the inner side of said head, and core material of relatively low structural strength filling said space between said outer skin and the outer side of said head.

3. In a plastic sandwich construction, a flat inner skin, a flat outer skin spaced therefrom, an outwardly curved circular plastic head between said skins having a circular portion adjacent said inner skin with other portions curved away to form a space and said head having a portion adjacent said outer skin with space between the other portions of the head and said outer skin, core material of relatively low structural strength filling said space between said inner skin and the inner side of said head, and core material of relatively low structural strength filling said space between said outer skin and the outer side of said head.

4. In a plastic sandwich construction an inner skin, an outer skin spaced therefrom, an outwardly curved head of plastic material between said skins having an outer surrounding portion connected to said inner skin with other portions curved away to form a space and said head having an outwardly curved intermediate portion adjacent said outer skin with space between the other portions of the head and said outer skin, core material of relatively low structural strength filling said space between said inner skin and the inner side of said head, and core material of relatively low structural strength filling said space between the said outer skin and the outer side of said head.

5. In a plastic sandwich construction a flat inner skin, a flat outer skin spaced therefrom, an outwardly curved circular head of plastic material between said skins having an outer circular portion connected to said inner skin with other portions curved away to form a space and said head having an outwardly curved intermediate portion bearing against said outer skin with space between the other portions of the head and said outer skin, core material of relatively low structural strength filling said space between said inner skin and the inner side of said head, and core material of relatively low structural strength filling said space between the said outer skin and the outer side of said head.

6. A plastic sandwich construction for a tank of the type having a cylindrical wall and having a flat end wall, said tank including an inner skin and an outer skin spaced therefrom and including core material of relatively low structural strength between said skins, the end of said tank having an outwardly curved head between said inner and outer skins with outer portions of said head connected to the ends of the inner skin of the cylindrical portion of the tank with other portions of the head spaced from the inner skin at the end of the tank and said head having an outwardly curved intermediate portion bearing against the outer skin at the end of the tank, some of said core material filling the space at the end of the tank between said inner skin and the inner side of said head and also the space between said outer skin and the outer side of said head.

7. A plastic sandwich construction for a tank of the type having a cylindrical wall and having a flat end wall, said tank including an inner skin and an outer skin spaced therefrom and including core material of relatively low structural strength between said skins, the end of said tank having an outwardly dished head between said inner and outer skins with outer portions of said head connected to the ends of the inner skin of the cylindrical portion of the tank with other portions of the head spaced from the inner skin at the end of the tank and said head having an outwardly curved intermediate portion bearing against the outer skin at the end of the tank, some of said core material filling the space at the end of the tank between said inner skin and the inner side of said head and also the space between said outer skin and the outer side of said head.

8. A plastic sandwich construction for a tank of the type having an enclosing wall forming a body and having an end wall, said tank including an inner skin and an outer skin spaced therefrom and including core material of relatively low structural strength between said skins, the end of said tank having an outwardly curved head of plastic material between said inner and outer skins with an outer surrounding portion of said head connected to both the inner and outer skins of the body of the tank with other portions of the head spaced from the inner skin at the end of the tank and said head having an outwardly curved intermediate portion adjacent the outer skin at the end of the tank, some of said core material filling the space at the end of the tank between said inner skin and the inner side of said head and also the space between said outer skin and the outer side of said head.

References Cited in the file of this patent

UNITED STATES PATENTS

| | | |
|---|---|---|
| 1,895,212 | Smith | Jan. 24, 1933 |
| 2,148,278 | Rose | Feb. 21, 1939 |
| 2,591,151 | Hansen et al. | Apr. 1, 1952 |
| 2,690,853 | Kircher | Oct. 5, 1954 |
| 2,805,787 | Sherman | Sept. 10, 1957 |
| 2,856,092 | Knapp | Oct. 14, 1958 |